United States Patent [19]

Stevens

[11] 4,265,343

[45] May 5, 1981

[54] CONTROLLED WHEEL BRAKING SYSTEM

[76] Inventor: Fred C. Stevens, One Garrett Pl., Bronxville, N.Y. 10708

[21] Appl. No.: 58,001

[22] Filed: Jul. 16, 1979

[51] Int. Cl.³ .............................................. B60T 8/04
[52] U.S. Cl. ................................ 188/181 T; 303/112
[58] Field of Search ...................... 188/181 R, 181 T; 303/112

[56] References Cited

U.S. PATENT DOCUMENTS

| 3,369,635 | 2/1968 | Davis .............................. | 188/181 T |
| 3,404,758 | 10/1968 | Mortimer ........................ | 188/181 T |

Primary Examiner—Duane A. Reger
Attorney, Agent, or Firm—Bachman and LaPointe

[57] ABSTRACT

A controlled wheel braking system for vehicles wherein fluid pressure on the wheel brake cylinder is relieved at the moment of wheel lock up so as to prohibit skidding and at the same time optimize the braking of the vehicle. The system includes a control valve positioned in the brake fluid line between the master cylinder and the wheel brake cylinder which is responsive to imminent wheel lock up. The control valve senses wheel lock up and upon sensing bleeds brake fluid from the wheel brake cylinder thereby preventing skidding.

7 Claims, 7 Drawing Figures

CONTROLLED WHEEL BRAKING SYSTEM

BACKGROUND OF THE INVENTION

The present invention relates to controlled wheel braking systems and more particularly to a controlled wheel braking system which is responsive to wheel lock up. The controlled wheel braking system of the present invention has particular utility in automotive vehicles, trucks, airplanes, tractors and the like.

The greatest deceleration of a vehicle occurs immediately prior to wheel lock up. As the operator of the vehicle increases the fluid pressure in the braking system, and, thus, the force of the brake shoes on the brake drum, vehicle deceleration is increased. When the fluid pressure in the braking system is increased beyond a certain optimum, the vehicle starts to skid thereby decreasing the actual rate of deceleration of the vehicle.

Naturally, it is highly desirable to employ a braking system which allows for optimum deceleration of the vehicle while at the same time prohibits the vehicle from skidding. By providing a system where fluid pressure is decreased at the instant of wheel lock up, the danger of skidding is eliminated and optimum vehicle braking is obtained.

Several types of antilocking vehicle braking systems are known in the art. Typically, the known systems employ electrical means for sensing the braking problems and thereafter activating the control means. Typical examples of these known systems are shown in U.S. Pat. Nos. 3,813,130 to M. Inada; 3,659,904 to F. Stevens; and 3,611,284 to J. Lewis. These systems suffer from a number of disadvantages, one substantial disadvantage being the high cost of manufacturing the systems. Another, and equally significant disadvantage, is that electrical control systems are not dependable over rough as well as smooth road surfaces.

In order to overcome the disadvantages associated with braking systems heretofore known, it would be highly desirable to design a controlled wheel braking system wherein fluid pressure is relieved upon sensing wheel lock up without the need of electrical components. By providing such a system, skidding is eliminated and optimum braking is obtained while manufacturing costs are held to a minimum.

Accordingly, it is the principal object of the present invention to provide an entirely mechanical controlled wheel braking system which is of simple construction, less costly to manufacture and more dependable than previously known systems.

It is a particular object of the present invention to provide a controlled wheel braking system in which the vehicle wheels are prevented from skidding regardless of the fluid pressure applied by the operator.

It is a still further object of the present invention to provide a controlled wheel braking system wherein the optimum rate of deceleration of the vehicle is obtained.

Further objects and advantages of the present invention will be apparent from a consideration of the ensuing disclosure.

SUMMARY OF THE INVENTION

In accordance with the present invention the foregoing objects and advantages are readily obtained.

The present invention provides a controlled wheel braking system which is of simple construction and less costly than known prior art systems. The controlled wheel braking system controls the braking force of the brake shoes on the brake drum, or the brake pads on the rotor in the case of disc brakes, so as to prevent skidding independent of the fluid pressure applied by the operator thereby maximizing vehicle deceleration.

In accordance with the present invention, a control valve is positioned in the brake fluid line between the master cylinder and the wheel brake cylinders. The control valve is responsive to the difference between the fluid pressure in the brake system and the frictional force between the brake shoes and the wheel brake drum or brake pads and rotor in the case of disc brakes due to the rate of deceleration of the wheel. As the fluid pressure increases there is an increase in the rate of wheel deceleration and correspondingly an increase in the friction force between the brake shoes and the brake drum or brake pads and rotor which balances the valve against the force of the fluid pressure. When the fluid pressure is sufficient to cause wheel lock up there is a decrease in the frictional force opposing the fluid pressure due to the decrease in the rate of deceleration which results from wheel slippage or skidding. As this occurs the valve is moved by the force of the fluid pressure so as to cut off the supply of fluid to the wheel brake cylinder and bleed a portion of the fluid from said cylinder thereby relieving the pressure of the brake shoes on the brake drum and thereby eliminate skidding.

Accordingly, it is seen that the present invention provides an improved controlled braking system that is of simple construction and provides considerable advantages over known braking systems. Thus, for example, the wheel braking system of the present invention provides for optimum braking of a vehicle while eliminating the danger of vehicle skidding. In accordance with the preferred embodiment of the present invention, a control valve is employed which is responsive to wheel imminent skidding so as to relieve fluid pressure applied to the brake shoes or brake pads in the case of disc brakes.

Further objects and advantages of the present invention will be apparent from a consideration of the ensuing detailed description.

DETAILED DESCRIPTION

The controlled wheel braking system of the present invention will be discussed hereinbelow in combination with conventional brake shoes and brake drums. It should be appreciated, however, that the system of the present invention is equally suitable for use with disc brakes.

Figure 2:
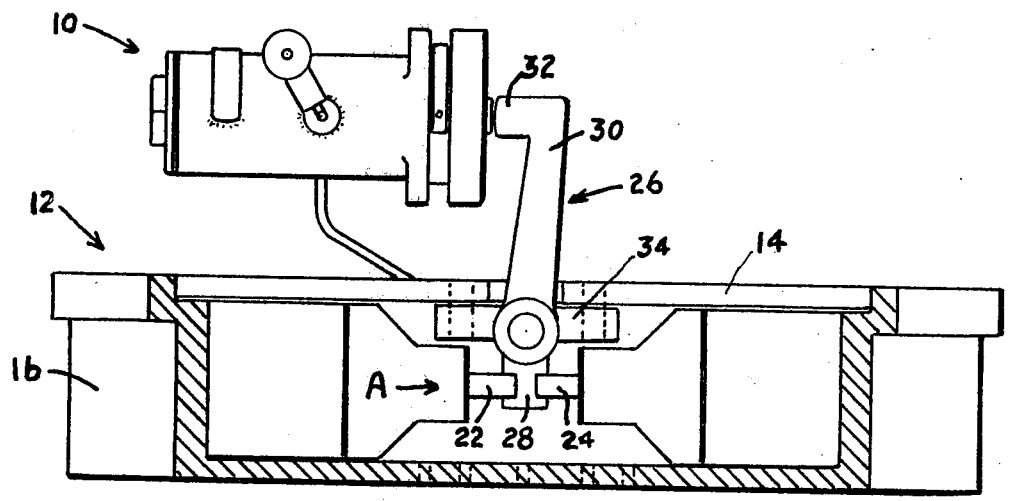
FIG. 2 is a partial sectional top view of the brake drum of FIG. 1.
Figure 1:
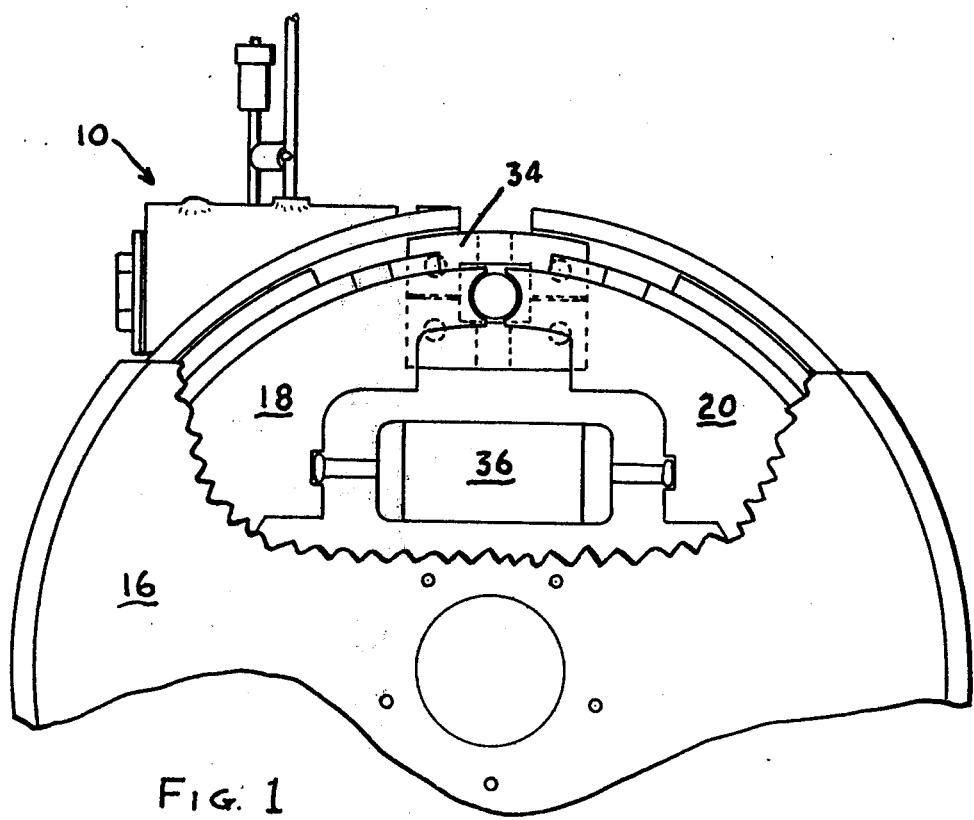
FIG. 1 is a partial sectional side view of a brake drum employing the mechanism of the present invention.

Referring to FIGS. 1 and 2, the valve mechanism 10 of the present invention is shown applied to a braking assembly 12 comprising a backing plate 14 together with a conventional brake drum 16. Within drum 16 and secured to backing plate 14 in a conventional manner are primary and secondary brake shoes 18 and 20, respectively, which abut at their free ends 22 and 24 the short end 28 of lever 26. Wheel brake cylinder 36 is connected to the brake shoes 18 and 20 and biases the shoes against brake drum 16 when fed with hydraulic fluid from the master cylinder which is actuated by the brake pedal of the vehicle. Lever 26 comprising short end 28 and long end 30 is pivotably mounted on bearings in a support frame 34 secured to the backing plate 14 by bolts, welding, or any other suitable manner.

Figure 3:
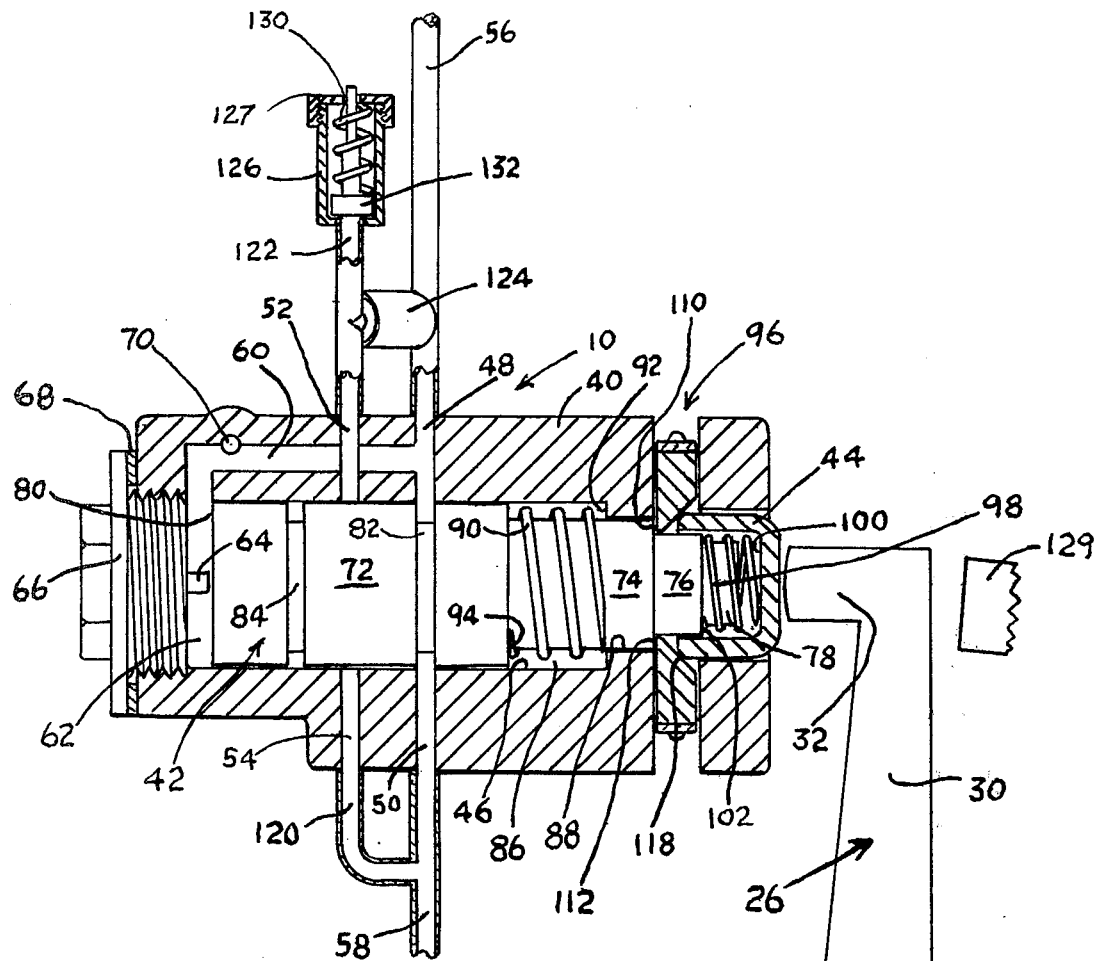
FIG. 3 is a schematic view illustrating the preferred embodiment of the controlled wheel braking mechanism employed in the system of the present invention.

Referring to FIG. 3, the long end 30 of lever 26 is provided with an extension 32 which, during normal braking, is biased against control valve unlocking cap 44 and thus the control valve spool 42 of valve mechanism 10. Valve mechanism 10 comprises a housing 40 having a central bore 46 which slidingly receives control valve spool 42. The housing 40 is provided with four ports 48, 50, 52 and 54, respectively, for communicating brake fluid from the master cylinder between brake fluid line 56 and line 58 which leads to the wheel brake cylinder 36. Housing 40 is provided with a channel 60 for communicating brake fluid from line 56 via port 48 to chamber 62 in one end of bore 46. Channel 60 has a bleed passage 70 for bleeding brake fluid to remove air whenever it is introduced into the hydraulic brake system. Bore 46 is provided with stop means 64 provided on threaded member 66 which, with gasket 68, seals bore 46.

Figure 4:
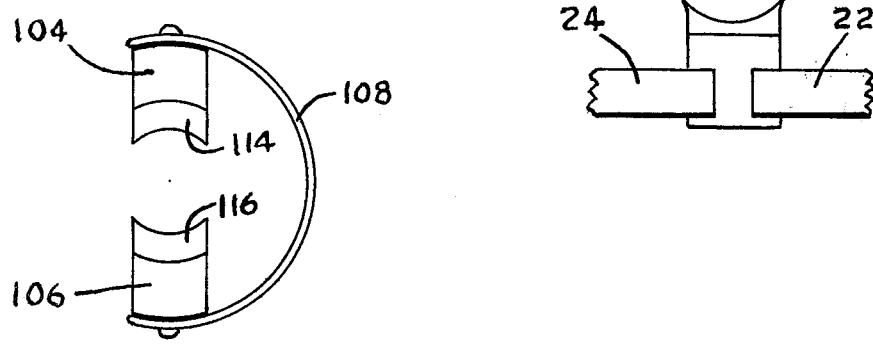
FIG. 4 is a detailed illustration of the control valve lock employed in the mechanism of FIG. 3.

Valve spool 42 comprises first, second, third and fourth portions 72, 74, 76 and 78, respectively. End face 80 of portion 72 normally rests against stop means 64 and is acted on by the brake fluid in chamber 62. Portion 72 is provided on its periphery with a pair of grooves 82 and 84, respectively, for selectively communicating ports 48 and 50 and ports 52 and 54, respectively, for reasons to be made clear hereinbelow. Portion 74 of valve spool 42 is partially received in chamber 86 formed in the other end of bore 46 and extends through orifice 88 provided in housing 40. Spring means 90 is provided around the periphery of portion 74 of valve spool 42 between the end wall 92 of housing 40 and end face 94 of portion 72 so as to bias the valve spool 42 against the stop means 64 and communicate ports 48 and 50 via groove 82. As can best be seen in FIGS. 3 and 4, portion 76 is received within valve spool locking key 96 and unlocking cap 44. Portion 78 lies within the unlocking cap 44 and spring means 98 is provided around the periphery of portion 78 between the end wall 100 of unlocking cap 44 and end face 102 of portion 76 so as to bias unlocking cap 44 toward extension 32 of lever 26. Stop 129 limits the movement of lever 26. As can be seen with reference to FIG. 4, valve spool locking key 96 comprises a pair of opposed locking teeth 104 and 106, respectively, connected together by circular spring means 108. End faces 110 and 112 of locking teeth 104 and 106, respectively, lock the valve spool 42 in place when no braking is taking place. Each of the locking teeth 104 and 106 is provided with a chamfer 114 and 116, respectively, adapted to abut a chamfer 118 provided on unlocking cap 44 for reasons to be made clear hereinbelow.

Referring again to FIG. 3, port 54 is in fluid communication line 58 via conduit 120 while port 52 communicates with brake fluid line 56 via conduit 122 and one-way check valve 124. An accumulator 126 is provided in fluid communication with conduit 122. Accumulator 126 comprises plunger 132 which is biased by spring 130. It should be appreciated that the volume of accumulator 126 may be adjusted by adjusting the position of cap 127. Alternatively, the accumulator may be selectively connected to an additional chamber so as to increase the effective volume thereof.

Referring to FIGS. 3, 5A, 5B and 5C, the operation of the controlled wheel braking system of the present invention will be discussed in detail.

Figure 5A:
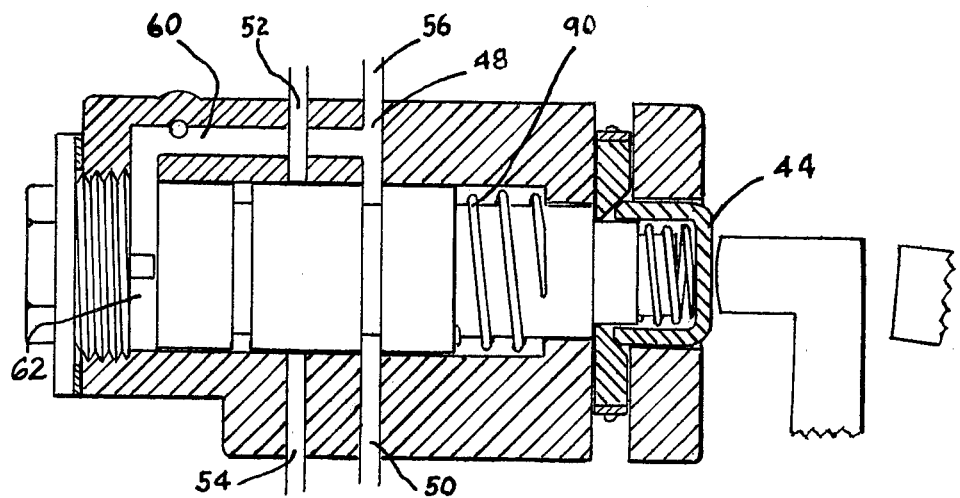
FIGS. 5A, 5B and 5C are schematic views illustrating the operation of the control valve in the system of the present invention.
Figure 5B:
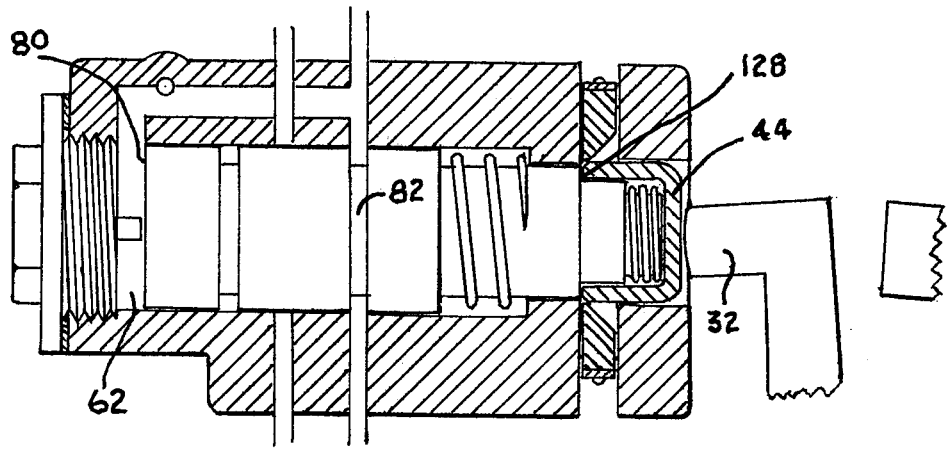

Under normal operation, valve spool 42 is in the position shown in FIGS. 3 and 5A and the main brake fluid line 56 from the master cylinder is connected through port 48, groove 82, port 50 and line 58 to a wheel brake cylinder. As the brakes are applied under normal conditions, brake fluid is forced from the master cylinder through main brake line 56, port 48, groove 82, port 50, line 58 to the wheel brake cylinder thereby pressing the brake shoes 18 and 20 against the brake drum 16. At the same time, the brake fluid is fed from port 48 via conduit 60 to chamber 62 where the fluid acts on end face 80 of spool valve 42 tending to move valve 42 to the right so as to cut off communication between ports 48 and 50. However, as the brake is applied, the friction between the brake drum 16 and the brake shoes 18 and 20 pushes the brake shoes in the direction of arrow A in FIG. 2 against the short end 28 of lever 26 causing the lever 26 to pivot in support 34 thereby forcing extension 32 on the long end 30 of lever 26 against locking cap 44 such that locking cap 44 is moved to the position shown in 5B where the locking teeth 104 and 106 are spread apart so as to enable the spool valve 42 to move at the appropriate time. At this time, while the brake is being applied under normal conditions, the spool valve 42 remains in its normal position as the force of the brake fluid acting on end face 80 of spool valve 42 is counteracted by the force of the lever 26 acting on unlocking cap 44 which in turn acts on end face 128 of portion 74 of spool valve 42 and the inside face of cap 44 acts on the end face of portion 78.

Figure 5C:
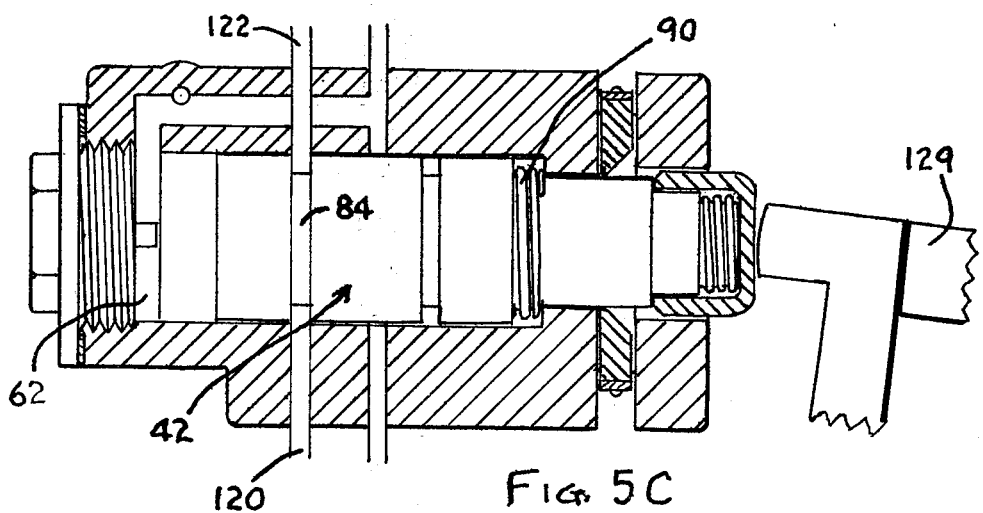

If, however, the brake fluid pressure in the wheel cylinder 36 is sufficient enough to cause wheel lock up, the frictional force between the brake shoes 18 and 20 and the brake drum 16 is reduced thereby resulting in a corresponding reduction in the force transmitted by lever 26 to cap 44 and end face 128 on portion 74 of valve 42 which acts in opposition to the fluid pressure in chamber 62 on end face 80 of valve 42. As a result of the excess fluid pressure acting on end face 80, the spool valve 42 is moved to its out position as shown in FIG. 5C where the communication of brake fluid from the master cylinder to the wheel brake cylinder 36 via line 56, port 48, groove 82, port 50 and line 58 is interrupted. At the same time, spool valve 42 is moved to connect ports 52 and 54 via groove 84 so as to bleed brake fluid from wheel cylinder 36 via line 58, conduits 120 and 122 to the accumulator 126. Under these circumstances the brake fluid will not flow from conduit 122 to main brake line 56 via one-way check valve 124 since, with the foot pedal held down, the pressure in line 56 is greater than that in conduit 122 thereby prohibiting the opening of check valve 124. The release of some brake fluid from wheel cylinder 36 allows the wheel to unlock thereby avoiding a skid while still providing optimum braking.

As long as the operator of the vehicle keeps the foot pedal depressed thereby forcing brake fluid from the master cylinder via main brake line 56 and conduit 60 to chamber 62, spool valve 42 will remain in the position illustrated in FIG. 5C and the accumulator 126 will remain full of brake fluid. When the foot pedal is released, the fluid pressure in line 56 and correspondingly that acting in chamber 62 on end face 80 of spool valve 42 is reduced thus allowing the valve 42 to be moved back again to its normal position as shown in FIGS. 3 and 5A under the urging of spring 90 thereby eliminating communication between ports 52 and 54 and reestablishing communication between ports 48 and 50. As the pressure in line 56 is reduced, brake fluid is forced from accumulator 126 via conduit 122 through check valve 124 back into the main brake line 56 under the urging of spring 130 acting on plunger 132. The mechanism of the controlled wheel braking system has now gone through a complete cycle.

The amount of time which elapses between wheel lock up and movement of spool valve 42 to its bleed position is minimal and therefore, any slide or skid of the vehicle is prevented.

The above system makes it possible to obtain optimum braking of the vehicle while preventing a slide or skid. The system is of simple construction and inexpensive to employ. The system of the present invention may be applied to all or any of the wheels of the vehicle as desired.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A hydraulic braking system for a vehicle wheel comprising a rotatable member, brake means and a fluid brake cylinder, said fluid brake cylinder having fluid pressure sensing means for transmitting force to said brake means so as to bias said brake means against said rotatable member, supply means for supplying fluid under pressure to said fluid pressure sensing means, valve means disposed between said supply means and said fluid pressure sensing means for controlling the flow of fluid to said fluid pressure sensing means and means associated with said brake means and said valve means for sensing the frictional force between said brake means and said rotatable member, said means for sensing said frictional force comprises a pivotably mounted lever means having a first short portion in contact with said brake means and a second longer portion in contact with said valve means for transmitting force to said valve means in response to said sensed frictional force wherein said valve means blocks the flow of fluid to said fluid pressure sensing means at the instant of vehicle wheel lock up sensed by said frictional force sensing means.

2. A system according to claim 1 wherein said valve means is responsive to the pressure of said fluid supplied by said supply means.

3. A system according to claim 1 wherein said valve means comprises a housing having a bore, spool valve means slidingly received in said bore and movable between a first position wherein said supply means supplies fluid to said fluid pressure sensing means and a second position wherein said fluid is relieved from said fluid pressure sensing means.

4. A system according to claim 3 wherein said fluid relieved from said fluid pressure sensing means is received in an accumulator.

5. A system according to claim 3 wherein one end of said valve means is exposed to the fluid supplied by said supply means tending to move said spool valve means to said second position and the other end of said spool valve means is responsive to said means for sensing said frictional force tending to maintain said valve in said first position.

6. A system according to claim 3 wherein said valve means further includes means for locking said spool valve in said first position.

7. A system according to claim 6 wherein said valve means further includes means responsive to said means for sensing said frictional force for unlocking said locking means.

* * * * *